United States Patent [19]

Rauenzahn et al.

[11] Patent Number: 5,679,132
[45] Date of Patent: Oct. 21, 1997

[54] METHOD AND SYSTEM FOR INJECTION OF A VAPORIZABLE MATERIAL INTO A MOLTEN BATH

[75] Inventors: Rick M. Rauenzahn, Los Alamos, N. Mex.; Christopher J. Nagel, Wayland, Mass.

[73] Assignee: Molten Metal Technology, Inc., Waltham, Mass.

[21] Appl. No.: 475,982

[22] Filed: Jun. 7, 1995

[51] Int. Cl.$^6$ ........................................... A62D 3/00
[52] U.S. Cl. ................... 75/528; 588/210; 423/DIG. 12
[58] Field of Search ........................... 266/216, 222, 266/268, 221, 267; 75/528; 588/210; 423/DIG. 12

[56] References Cited

U.S. PATENT DOCUMENTS

| | | | |
|---|---|---|---|
| 2,854,229 | 9/1958 | Earle | 266/41 |
| 3,608,881 | 9/1971 | Yordanov et al. | 266/41 |
| 3,771,473 | 11/1973 | Borgnat et al. | 110/182.5 |
| 3,997,334 | 12/1976 | Dlubek | 75/60 |
| 4,574,714 | 3/1986 | Bach et al. | 110/346 |
| 4,602,574 | 7/1986 | Bach et al. | 110/346 |
| 4,647,019 | 3/1987 | Masterson et al. | 266/243 |
| 4,657,586 | 4/1987 | Masterson et al. | 75/76 |
| 4,708,738 | 11/1987 | Masterson et al. | 75/59.1 |
| 4,754,951 | 7/1988 | Masterson et al. | 266/47 |
| 4,820,340 | 4/1989 | Richards et al. | 75/24 |
| 5,177,304 | 1/1993 | Nagel | 588/201 |
| 5,191,154 | 3/1993 | Nagel | 588/201 |
| 5,202,100 | 4/1993 | Nagel et al. | 423/5 |
| 5,211,743 | 5/1993 | Brunner | 75/557 |
| 5,215,573 | 6/1993 | Brunner | 75/708 |
| 5,396,850 | 3/1995 | Conochie et al. | 110/346 |
| 5,436,210 | 7/1995 | Wilkinson et al. | 588/201 |

FOREIGN PATENT DOCUMENTS

| | | |
|---|---|---|
| 666171 | 7/1963 | Canada . |
| 92/12265 | 7/1992 | WIPO . |
| 94/00533 | 1/1994 | WIPO . |

*Primary Examiner*—Scott Kastler
*Attorney, Agent, or Firm*—Hamilton, Brook, Smith & Reynolds, P.C.

[57] ABSTRACT

A method and apparatus are disclosed for injecting vaporizable material, such as a vaporizable waste, into a molten bath. A gas is injected into the molten bath at a rate which is sufficient to cause the gas and the molten bath to form a gaseous dispersion. The gas component of the gaseous dispersion occupies a sufficient fraction of said dispersion to cause a significant portion of the vaporizable material, at a rate at which the vaporizable material is injected into the molten bath, to volatilize, combust or decompose during exposure to said gas component. A vaporizable material, such as a particulate solid or hazardous liquid waste, is injected into the gaseous dispersion at a rate which cases a significant portion of the vaporizable material to volatilize, combust or decompose during exposure of said vaporizable material to the gas component of said gaseous dispersion.

22 Claims, 1 Drawing Sheet

METHOD AND SYSTEM FOR INJECTION OF A VAPORIZABLE MATERIAL INTO A MOLTEN BATH

BACKGROUND OF THE INVENTION

The availability of methods for treatment of hazardous wastes is limited. Conventional methods for disposal of hazardous wastes, such as incineration, can also contaminate the environment. For example, incomplete combustion of hazardous wastes typically causes release of pollutants to the atmosphere in the form of gases and dust. Hazardous wastes are also difficult to dispose of by conventional methods because the amount of suitable space which is available for burial of such wastes is rapidly diminishing. Further, such wastes often leak or leach from disposal sites, generally diminishing the quality of life in surrounding populations.

One alternative attempt to treat hazardous wastes includes their destruction in a reactor containing a molten bath. Typically, the wastes are directed into the reactor onto the top of the molten bath therein. However, waste components often volatilize and are discharged from the reactor before they can decompose in the presence of the molten bath.

Other known methods for combining hazardous waste with a molten metal include, for example, submerged injection of the waste through tuyeres. However, submerged injection generally can not be extended to many vaporizable material wastes because most such wastes have a nucleation temperature which is substantially lower that of the molten bath into which they are injected. Direct contact between liquid wastes and molten baths into which they are injected typically causes instantaneous volatilization, combustion or decomposition of the wastes and consequent violent, or explosive, destruction of the molten bath, thereby causing a safety hazard for those operating such reactor systems.

Therefore, a need exists for a method and system for submerged injection of vaporizable materials into molten baths which overcome or minimize the above-mentioned problems.

SUMMARY OF THE INVENTION

The present invention relates to a method and an apparatus for injecting a vaporizable material into a molten bath having a temperature which is significantly higher than the nucleation, combustion or decomposition temperature of the vaporizable material.

The method includes injecting a gas into the molten bath at a rate which is sufficient to cause the gas and the molten bath to form a gaseous dispersion. The gas component of the gaseous dispersion occupies a sufficient fraction of said dispersion to cause a significant portion of the vaporizable material, at a rate at which the vaporizable material is injected into the molten bath, to volatilize, combust or decompose during exposure to said gas component. The vaporizable material is injected into the gaseous dispersion at a rate which causes a significant portion of the vaporizable material to volatilize, combust or decompose during exposure of said vaporizable material to the gas component of said gaseous dispersion.

The system includes a vessel for disposing a molten bath therein. Suitable means at the vessel inject a gas into the molten bath at a rate which is sufficient to cause the gas and the molten bath to form a gaseous dispersion. The gas component of the gaseous dispersion occupies a sufficient fraction of said dispersion to cause a significant portion of the vaporizable material, at a rate at which the vaporizable material is injected into the molten bath, to volatilize, combust or decompose during exposure to said gas component. Suitable means inject the vaporizable material into the gaseous dispersion at a rate which causes a significant portion of the vaporizable material to volatilize, combust or decompose during exposure of said vaporizable material to the gas component of said gaseous dispersion.

This invention has many advantages. For example, vaporizable material hazardous wastes, such as particulate solid and liquid hazardous wastes which have a nucleation temperature that is significantly below that of a temperature of a molten bath, can be injected into the molten metal bath without a substantial risk of explosion. Also, the reaction conditions of the molten bath can be controlled by the components of the vaporizable material waste and/or the rate at which the vaporizable material is directed into the molten bath. The composition of gaseous products generated by reaction within the molten bath can also be controlled by the composition and relative rates of introduction of the components of the injected vaporizable material.

In addition, distribution of reactive components of the injected vaporizable material can be controlled by the rate at which the vaporizable material is injected into the molten bath. Further, the location, or locations, at which the vaporizable material and gas are injected into the molten bath can be arranged to increase the yield of reactions in the molten bath, thereby significantly diminishing the amount of unreacted and partially decomposed components of the vaporizable material injected into the molten bath.

DETAILED DESCRIPTION OF THE INVENTION

The features and other details of the method of the invention will now be more particularly described with reference to the accompanying figures and pointed out in the claims. The same number present in different figures represents the same item. It will be understood that particular embodiments of the invention are shown by way of illustration and not as limitations of the invention. The principle features of this invention can be employed in various embodiments without departing from the scope of the invention.

The present invention generally relates to a method and system for injecting a vaporizable material into a molten bath having a temperature which is significantly higher than the nucleation, combustion or decomposition temperature of the vaporizable material. Bach et al., U.S. Pat. Nos. 4,754,714 and 4,602,574, disclose a molten metal bath, such as is used in a steelmaking facility, which destroys polychlorinated biphenyls and other organic wastes, optionally together with inorganic wastes. Nagel, U.S. patent application Ser. No. 07/557,561, filed Jul. 24, 1990, discloses a method and system for forming carbon dioxide from carbon-containing materials in a molten metal bath of immiscible metals. Nagel, U.S. patent application Ser. No. 07/737,048, filed Jul. 29, 1991, discloses a method and system for controlling chemical reaction in a molten metal bath. Nagel et al., U.S. patent application Ser. No. 07/737,199, filed Jul. 29, 1991, discloses a method and system of formation of oxides of dissolved atomic constituents in a molten metal bath. Nagel et al., U.S. patent application Ser. No. 07/788, 804, filed Nov. 7, 1991, discloses a method and system for reducing the volume of radioactive compositions. Nagel et al., U.S. patent application Ser. Nos. 07/895,358 and 07/895, 346, filed Jun. 8, 1992, both disclose methods and apparatus for forming enriched hydrogen and carbon oxide gas streams form organic material in molten baths. The teachings of U.S. Pat. Nos. 4,754,714 and 4,602,574, and of U.S. patent applications Ser. Nos. 07/557,561, 07/737,048, 07/737,199, 07/788,804, 07/895,358, and 07/895,346 are incorporated herein by reference.

Figure 1:
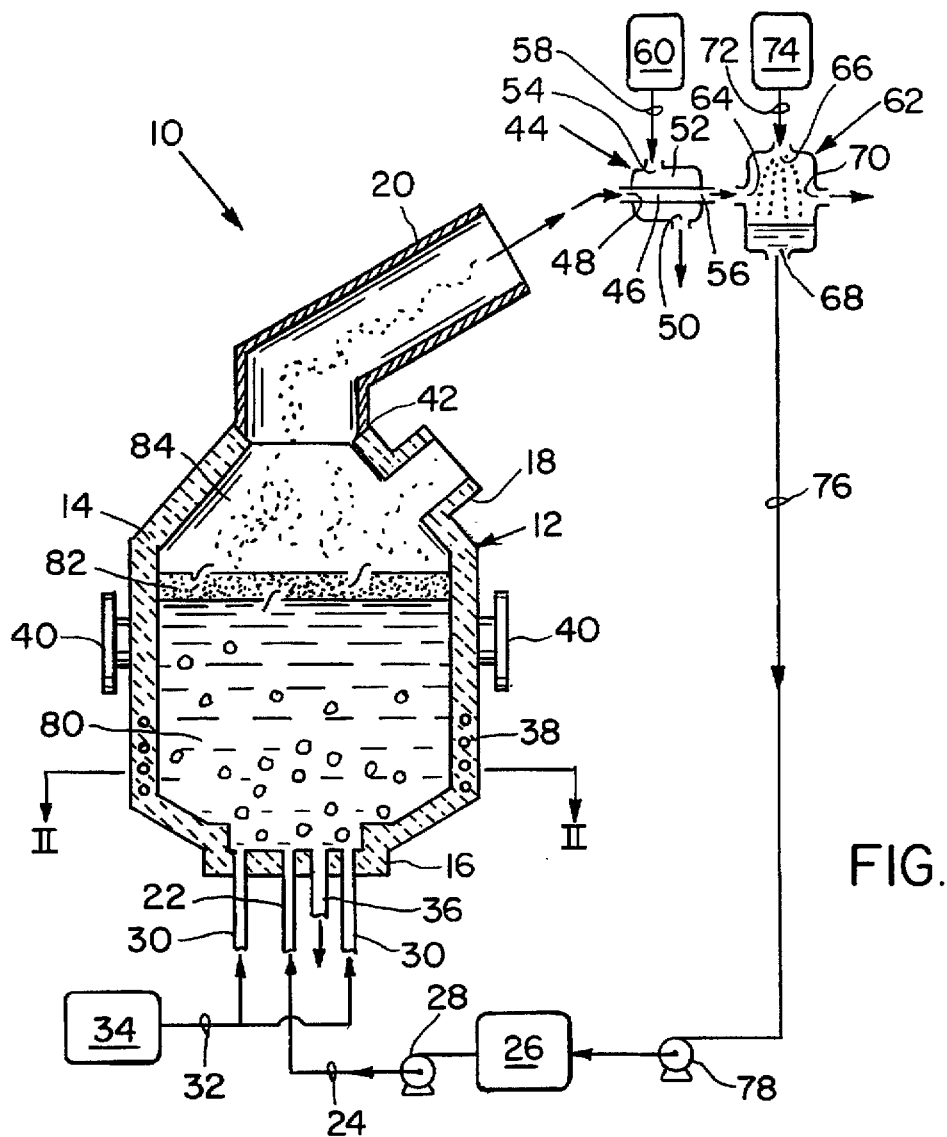
FIG. 1 is a schematic representation of one embodiment of the apparatus of the invention.

System 10, illustrated in FIG. 1, is one embodiment of apparatus suitable for injecting a vaporizable material into a molten bath having a temperature which is significantly higher than the nucleation, combustion or decomposition temperature of the vaporizable material according to the method of the invention. The system includes reactor 12. Examples of suitable reactors include K-BOP, Q-BOP, argon-oxygen decarbonization furnaces (AOD), EAF, etc., such as are known in the art of steelmaking. Reactor 12 includes upper portion 14 and lower portion 16. Feed inlet 18 at upper portion 14 of reactor 12 is suitable for directing feed into reactor 12. Off-gas outlet 20 extends from upper portion 14 and is suitable for conducting an off-gas out of reactor 12.

Vaporizable material inlet 22 is disposed at lower portion 16 of reactor 12. Vaporizable material inlet 22 is suitable for directing a suitable vaporizable material, such as a particulate solid or liquid waste, into a molten bath disposed in reactor 12 according to the method of the invention. Conduit 24 extends from vaporizable material source 26 to vaporizable material inlet 22 at reactor 12. Pump 28 is disposed at conduit 24 for directing vaporizable material from vaporizable material source 26 through conduit 24 and vaporizable material inlet 22 into reactor 12. Optionally, vaporizable material inlet 22 can be a tuyere, not shown, wherein a suitable vaporizable material is directed through a central feed tube and a suitable shroud gas is conducted through an outer tube which is disposed concentrically about the inner vaporizable material inlet.

Gas inlets 30 are disposed at lower portion 16 of reactor 12 at a location remote from vaporizable material inlet 22. It is to be understood that, alternatively, only a single gas inlet need be disposed at lower portion 16 of reactor 12. Conduit 32 extends from gas source 34 to gas inlets 30. Optionally, gas inlets 30 can be tuyeres. In one embodiment, the tuyeres, not shown, each include an inner conduit for conducting the gas from conduit into a molten bath in reactor 12. The tuyeres each also include an outer tube for conducting a suitable shroud gas into a molten bath in reactor 12.

Bottom-tapping spout 36 extends from lower portion 16 and is suitable for removal of at least a portion of a molten bath from reactor 12. An additional bottom-tapping spout, not shown, can be provided as a means of continuously or intermittently removing at least a portion of a molten bath from reactor 12. Material in reactor 12 can also be removed by other means, such as are well known in the art of steelmaking. For example, material can be removed from reactor 12 by rotating reactor 12 and employing a launder, not shown, extending from feed inlet 18. Alternatively, the launder can extend into reactor 12 through a tap-hole, not shown.

Induction coil 38 is disposed at lower portion 16 for heating a molten bath within reactor 12 or for initiating generation of heat within reactor 12. It is to be understood that, alternatively, reactor 12 can be heated by other suitable means, such as by oxyfuel burners, electric arc, etc. Trunions 40 are disposed at reactor 12 for manipulation of reactor 12. Seal 42 is disposed between reactor 12 and off-gas outlet 20 and is suitable for allowing partial rotation of reactor 12 about trunions 40 without breaking seal 42. Alternatively, reactor 12 does not include trunions 40 or seal 42 and does not rotate.

Heat exchanger 44 is disposed at off-gas outlet 20. Heat exchanger 44 can be any suitable heat exchanger for cooling off-gas discharged from reactor 12. Examples of suitable heat exchangers include water-cooled hoods, shell-and-tube heat exchangers, etc. In one embodiment, heat exchanger 44 is a shell-and-tube heat exchanger which includes off-gas side 46 defining off-gas inlet 48 and off-gas outlet 50. Heat exchanger 44 also includes coolant side 52 which defines coolant inlet 54 and coolant outlet 56. Conduit 58 extends between coolant source 60 and coolant inlet 54 of heat exchanger 44. A coolant which is suitable for cooling off-gas is disposed at coolant source 60. Examples of suitable cooling media include, for example, water, ethylene glycol, ethylbenzene, alcohols, etc.

Scrubber 62 is disposed at off-gas outlet 50 of heat exchanger 44. Scrubber 62 is suitable for removing a component of the off-gas to form a stream which can be directed into reactor 12 or disposed of by some other suitable means. An example of a suitable scrubber is a caustic-type scrubber. Scrubber 62 defines off-gas inlet 64, scrubber vaporizable material inlet 66, scrubber vaporizable material outlet 68, and off-gas outlet 70. Conduit 72 extends between scrubber vaporizable material source 74 and scrubber vaporizable material inlet 66 of scrubber 62. A scrubber vaporizable material which is suitable for separating at least one component of off-gas from the off-gas is disposed at scrubber vaporizable material source 74. Examples of suitable scrubber vaporizable materials include sodium hydroxide (NaOH), calcium hydroxide ($Ca(OH)_2$), etc.

Conduit 76 extends from scrubber outlet to vaporizable material source 26. Pump 78 is disposed at conduit 76 for directing scrubber vaporizable material from scrubber 62 to vaporizable material source 26.

A reaction zone within the system includes molten bath 80, vitreous layer 82 and gaseous layer 84. In one embodiment, molten bath 80 is formed by at least partially filling reactor 12 with a suitable metal. The metal is then heated to form molten bath 80 by activating induction coil 38 or by some other suitable means, not shown. Where a molten bath having immiscible phases is to be formed, two immiscible metals are introduced to reactor 12. The metals separate during melting to form a first molten metal phase and a second molten metal phase, which is substantially immiscible in the first molten metal phase.

Vitreous layer 82 is disposed on molten bath 80. Vitreous layer 82 is substantially immiscible with molten bath 80. Alternatively, system 10 does not include vitreous layer 82. Vitreous layer 82 includes at least one metal oxide. Typically, vitreous layer 82 is substantially vaporizable material and free radicals and other gases can pass from molten bath 80 across vitreous layer 82. In one embodiment, vitreous layer 82 has a lower thermo-conductivity than that of molten bath 80. Radiant loss of heat from molten bath 80 can thereby be reduced to significantly below the radiant heat loss for molten bath 80 in the absence of a slag layer. It is to be understood that vitreous layer 82 can include more than one metal oxide. Vitreous layer 82 can also include more than one phase.

Vitreous layer 82 can be formed by directing suitable materials into reactor 12 and then heating the materials to a sufficient temperature to melt the materials. Vitreous layer 82 can also comprise slag or sludge contaminated with toxic metals or other valuable metals or their oxides that are suitable for reclamation. The materials can be directed onto the top of molten bath 80 or injected into molten bath 80, using methods such as are well known in the art of steel-making.

Gaseous layer 84 extends from vitreous layer 82 at upper portion 14 of reactor 12 through off-gas outlet 20 to scrubber 62. Gaseous layer 84 includes off-gas formed in molten bath 80 and in vitreous layer 82. Off-gas is at least partially formed by volatilization and reaction of components of the vaporizable material and gaseous feed to form gases, such as carbon monoxide and, optionally, carbon dioxide.

A suitable gas is directed from gas source 34 through conduit 32 and gas inlets 30 into molten bath 80. The gas is directed through gas inlets 30 into molten bath 80 by a suitable means. An example of suitable means by which the gas is directed through gas inlets 30 into molten bath 80 includes pressurization of gas source 34.

The rate at which the gas is directed through gas inlets 30 into molten bath 80 is sufficient to cause the gas and molten bath 80 to form a suitable gaseous dispersion. The gas component of a suitable gaseous dispersion occupies a sufficient fraction of the dispersion to cause a significant portion of a vaporizable material injected into molten bath 80, at a rate at which the vaporizable material is injected into molten bath 80, to volatilize, combust or decompose during exposure to the gas component. An example of a suitable gaseous dispersion is a gaseous dispersion wherein the gas component occupies between about thirty-five and about one-hundred percent of the total volume of the gaseous dispersion. In one embodiment, the gas component occupies greater than about forty percent of the total volume of the gaseous dispersion. In another embodiment, the gas component occupies greater than about forty-five percent of the total volume of the gaseous dispersion. In still another embodiment, the gas component occupies greater than about ten percent of the total volume of molten bath 80, such as a volume in a range of between about ten and thirty percent of the total volume of molten bath 80.

The gas directed through gas inlets 30 can have a Froude number of greater than, for example, about 2400, to thereby prevent molten metal of molten bath 80 from entering gas inlets 30 and thereby blocking introduction of gas through gas inlets 30 into molten bath 80. Optionally, molten bath 80 can be agitated to further particulate gas which is directed into molten bath 80. An example of a suitable method for agitating molten bath 80 is by pneumatic injection.

In one embodiment, the gas employed for forming the gaseous dispersion in molten bath 80 is substantially inert under the conditions of the molten bath 80. Examples of such gases include argon, hydrogen, nitrogen, carbon monoxide, carbon dioxide, etc. Alternatively, the gas can be reactive with a component of molten bath 80 or with a vaporizable material directed into molten bath 80. Examples of reactive gases include oxygen, hydrogen, etc.

Vaporizable material is injected from vaporizable material source 20 through conduit 24 and vaporizable material inlet 22 into molten bath 80 by activation of pump 28. In one embodiment, the gas and the vaporizable material are directed into molten bath 80 simultaneously and continuously. Alternatively, the vaporizable material is injected into molten bath 80 after a gaseous dispersion has been formed. The rate at which the vaporizable material is injected into molten bath 80 is sufficient to cause a significant portion of the vaporizable material to volatilize, combust or decompose during exposure of said vaporizable material to the gas component of the gaseous dispersion. Suitable operating conditions of system 10 include a temperature of molten bath 80 which is sufficient to volatilize, combust, or decompose a substantial portion of the vaporizable material injected into molten bath 80. An example of a suitable temperature is a temperature above about 1500° C.

The term "significant portion," as used herein, means the portion of the vaporizable material which volatilizes, combusts or decomposes while exposed to the gas component of the gaseous dispersion, is sufficient to prevent catastrophic propagation of the void fraction of the gaseous dispersion by rupture of the bubbles of the gas component in the gaseous dispersion, such as by the occurrence of an explosion of molten bath 80. Volatilization, combustion or decomposition of greater portions of the vaporizable material during exposure to the molten component of the gaseous dispersion will, consequently, result in catastrophic propagation of the gas bubbles, and explosion of molten bath 80. An example of a significant portion of the vaporizable material which volatilizes, combusts or decomposes during exposure to the gas component of the gaseous dispersion is in the range of between about forty and one-hundred percent.

In one embodiment, the vaporizable material is reactive with the gas injected into molten bath 80 and/or with a component of molten bath 80. In one embodiment, the vaporizable material is combustible under the operating conditions of system 10 in molten bath 80. Examples of suitable vaporizable materials include particulate solids and liquids which have a nucleation, combustion or decomposition temperature which is significantly lower than that of the operating temperature of molten bath 80. The particulate solid or liquid can be a hazardous waste. Examples of suitable vaporizable materials include vaporizable material hazardous wastes which substantially volatilize under the operating conditions of system 10 in molten bath 80. Specific examples of suitable vaporizable material wastes include organics, chlorinated organics, aqueous sludges, vaporizable metal-containing sludges, etc. Upon introduction of the vaporizable material through vaporizable material inlet 22 into molten bath 80, a significant portion of the vaporizable material volatilizes, combusts or decomposes during exposure of the vaporizable material to the gas component of the gaseous dispersion. Combustion of the vaporizable material can occur in combination with a component of the gas or molten components of the gaseous dispersion or with another component of the vaporizable material.

The volatilized material, or combustion or decomposition products of the vaporizable material can react with other gas components of the gaseous composition or with a component of molten bath 80. Reaction products can dissolve in molten bath 80 or be discharged as gaseous products from molten bath 80. Other components of off-gas formed in reactor can include hydrogen gas, water, etc., formed by chemical transformation of other components of the vaporizable material or gas directed into molten bath 80, such as organic compounds.

In one embodiment, off-gas formed in reactor 12 is conducted from reactor 12 through off-gas outlet 20 to heat exchanger 44. The off-gas is cooled in heat exchanger 44 by conducting the off-gas through off-gas side 46 of heat exchanger 44 and by directing a suitable cooling medium through coolant side 52 of heat exchanger 44. The off-gas is conducted into heat exchanger 44 through off-gas inlet 48 and then through off-gas outlet 50. The coolant is directed from source 60 through coolant inlet 54 of heat exchanger 44 by a suitable means, such as by use of a pump, not shown. The coolant is directed through coolant side 52 of heat exchanger 44, by cooling the off-gas, and is then directed out of heat exchanger 44 through coolant outlet 56. The coolant is conducted through heat exchanger 44 at a rate sufficient to cool the off-gas to a temperature suitable for subsequent formation of a vaporizable material composition from the cooled off-gas. In one embodiment, the off-gas is cooled to a temperature below about 500° C.

The off-gas is directed out of off-gas outlet 50 to scrubber 62 in order to expose the off-gas to conditions sufficient to remove at least one component from the off gas for further processing, such as return to reactor 12 or for treatment in an additional reactor, not shown. Examples of methods for treatment of the off-gas, including its separation and processing of components of the off gas, are disclosed in U.S. patent application Ser. No. 07/737,048, the teachings of which are included herein by reference.

In those cases where the off-gases contain volatile, readily reducible metal, such as zinc, mercury and cadmium, the gases can be directed to a condenser and recovered by condensation. The gaseous metal vapors can be condensed and the vaporizable material metal and alloys can be tapped in a suitable manner, such as by scrubbing. Optionally, material that accumulates at the condenser can be recycled to the reaction zone. Non-volatile metals can be tapped as an alloy. Also, carbon monoxide can be a recoverable product of the method.

A vaporizable material stream formed by scrubbing the off-gas can be directed through conduit 72 to vaporizable material source 26 for combination with the vaporizable material directed from vaporizable material source 26 and for direction into molten bath 80.

Figure 2:
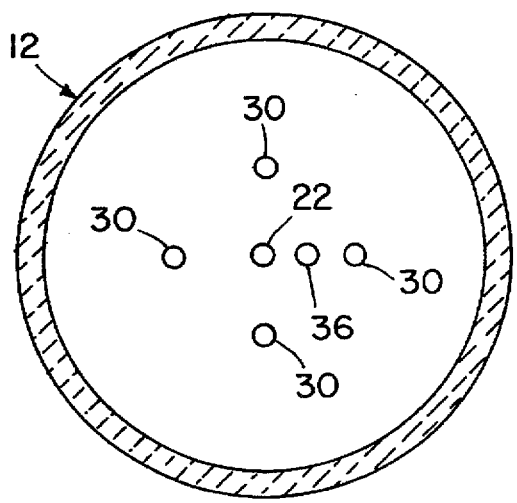
FIG. 2 is a section view of a reactor of the apparatus shown in FIG. 1, taken along line II—II.

As can be seen in FIG. 2, which is a section view of reactor 12 taken along line II—II, gas inlets are radially disposed about vaporizable material inlet 22. It is to understood, however, that other configurations for introduction of the gas and vaporizable material into reactor 12 can be employed. For example, other configurations of multiple gas inlets can be disposed at reactor 12, such as an eccentric distribution of the gas inlets relative to the vaporizable material inlet. Alternatively, the system of the invention can employ a single gas inlet and a single vaporizable material inlet. Also, a plurality of vaporizable material inlets can be employed in combination with a single gas inlet or plurality of gas inlets.

Equivalents

Those skilled in the art will recognize, or be able to ascertain using no more than routine experimentation, many equivalents of the invention describes specifically herein. Such equivalents are intended to be encompassed in the scope of the following claims.

We claim:

1. A method for injecting a vaporizable material into a molten bath having a temperature which is significantly higher than the nucleation, combustion or decomposition temperature of the vaporizable material, comprising the steps of:

a) injecting a gas into the molten bath at a rate which is sufficient to cause the gas and the molten bath to form a gaseous dispersion, the gas component of the gaseous dispersion occupying a sufficient fraction of said dispersion to cause a significant portion of the vaporizable material, at a rate at which the vaporizable material is injected into the molten bath, to volatilize, combust or decompose during exposure to said gas component, and thereby ensure that the molten bath will not explode; and b) injecting the vaporizable material into the gaseous dispersion at a rate which causes a significant portion of the vaporizable material to volatilize, combust or decompose during exposure of said material to the gas component of said gaseous dispersion, thereby ensuring that the molten bath will not explode.

2. The method of claim 1 wherein the vaporizable material is injected into the molten bath at a point beneath the molten bath upper surface which is remote from the point where the gas is injected into the molten bath.

3. The method of claim 2 wherein the gas is injected into the molten bath at a plurality of points beneath the molten bath surface.

4. The method of claim 3 wherein the points at which the gas is injected into the molten bath are disposed radially about the point where the vaporizable material is injected into the molten bath.

5. The method of claim 4 when the vaporizable material is injected into the molten bath at a plurality of points beneath the molten bath surface.

6. The method of claim 1 wherein the gas and the vaporizable material are directed into the molten bath through a tuyere which is disposed beneath the molten bath upper surface.

7. The method of claim 6 wherein the gas and the vaporizable material are directed into the molten bath jointly and continuously.

8. The method of claim 1 wherein the vaporizable material is a particulate solid.

9. The method of claim 1 wherein the vaporizable material is a liquid.

10. The method of claim 9 wherein the liquid is atomized to form a liquid dispersion which is subsequently injected into the molten bath beneath the molten bath upper surface.

11. The method of claim 10 further including the step of agitating the molten bath in an amount sufficient to significantly increase the surface area of the gas component of the gaseous dispersion.

12. The method of claim 11 wherein the liquid dispersion is directed into the molten bath at a plurality of points beneath an upper surface of the molten bath.

13. The method of claim 12 wherein the gas component of the liquid dispersion is substantially inert under the operating conditions of the molten bath.

14. The method of claim 12 wherein a substantial portion of the gas component of the liquid dispersion reacts with a component of the molten bath under the operating conditions of the molten bath.

15. The method of claim 14 wherein the liquid component of the liquid dispersion is substantially combustible under the operating conditions of the molten bath.

16. The method of claim 1 wherein the molten bath is a molten metal bath.

17. A method for injecting a vaporizable material into a molten bath having a temperature which is significantly higher than the nucleation, combustion or decomposition temperature of the vaporizable material, comprising the steps of:

a) injecting a gas into the molten bath at a rate which is sufficient to cause the gas and the molten bath to form a gaseous dispersion, the gas component of the gaseous dispersion occupying greater than about thirty-five percent of the volume of said dispersion to cause a significant portion of the vaporizable material, at a rate at which the vaporizable material is injected into the molten bath, to volatilize, combust or decompose during exposure to said gas component, and thereby ensure that the molten bath will not explode; and b) injecting the vaporizable material into the gaseous dispersion at a rate which causes a significant portion of the vaporizable material to volatilize, combust or decompose during exposure of said material to the gas component of said gaseous dispersion, thereby ensuring that the molten bath will not explode.

18. A method for injecting a vaporizable material into a molten bath having a temperature which is significantly higher than the nucleation, combustion or decomposition temperature of the vaporizable material, comprising the steps of:

a) injecting a gas into the molten bath at a rate which is sufficient to cause the gas and the molten bath to form a gaseous dispersion, the gas component of the gaseous dispersion occupying greater than about forty-five percent of the volume of said dispersion to cause a significant portion of the vaporizable material, at a rate at which the vaporizable material is injected into the molten bath, to volatilize, combust or decompose during exposure to said gas component, and thereby ensure that the molten bath will not explode; and b) injecting the vaporizable material into the gaseous dispersion at a rate which causes a significant portion of the vaporizable material to volatilize, combust or decompose during exposure of said material to the gas component of said gaseous dispersion, thereby ensuring that the molten bath will not explode.

19. A method for injecting a vaporizable material into a molten bath having a temperature which is significantly higher than the nucleation, combustion or decomposition temperature of the vaporizable material, comprising the steps of:

a) injecting a gas into the molten bath at a rate which is sufficient to cause the gas and the molten bath to form a gaseous dispersion, the gas component of the gaseous dispersion occupying a sufficient fraction of said dispersion to cause a significant portion of the vaporizable material, at a rate at which the vaporizable material is injected into the molten bath, to volatilize, combust or decompose during exposure to said gas component, and thereby ensure that the molten bath will not explode; and thereafter b) injecting the vaporizable material into the gaseous dispersion at a rate which causes a significant portion of the vaporizable material to volatilize, combust or decompose during exposure of said material to the gas component of said gaseous dispersion, thereby ensuring that the molten bath will not explode.

20. A method for injecting a vaporizable material into a molten bath having a temperature which is significantly higher than the nucleation, combustion or decomposition temperature of the vaporizable material, comprising the steps of:

a) injecting a gas into the molten bath at a rate which is sufficient to cause the gas and the molten bath to form a gaseous dispersion, the gas component of the gaseous dispersion occupying greater than about forty percent of the volume of said dispersion to cause a significant portion of the vaporizable material, at a rate at which the vaporizable material is injected into the molten bath, to volatilize, combust or decompose during exposure to said gas component, and thereby ensure that the molten bath will not explode; and thereafter b) injecting the vaporizable material into the gaseous dispersion at a rate which causes a significant portion of the vaporizable material to volatilize, combust or decompose during exposure of said material to the gas component of said gaseous dispersion, thereby ensuring that the molten bath will not explode.

21. A method for injecting a vaporizable material into a molten bath having a temperature which is significantly higher than the nucleation, combustion or decomposition temperature of the vaporizable material, comprising the steps of:

a) injecting a gas into the molten bath at a rate which is sufficient to cause the gas and the molten bath to form a gaseous dispersion, the gas component of the gaseous dispersion occupying greater than about ten percent of the volume of said molten bath, to cause a significant portion of the vaporizable material, at a rate at which the vaporizable material is injected into the molten bath, to volatilize, combust or decompose during exposure to said gas component, and thereby ensure that the molten bath will not explode; and b) injecting the vaporizable material into the gaseous dispersion at a rate which causes a significant portion of the vaporizable material to volatilize, combust or decompose during exposure of said material to the gas component of said gaseous dispersion, thereby ensuring that the molten bath will not explode.

22. A method for injecting a vaporizable material into a molten bath having a temperature which is significantly higher than the nucleation, combustion or decomposition temperature of the vaporizable material, comprising the steps of:

a) injecting a gas into the molten bath at a rate which is sufficient to cause the gas and the molten bath to form a gaseous dispersion, the gas component of the gaseous dispersion occupying between about ten percent and about thirty percent of the total volume of said bath, to cause a significant portion of the vaporizable material, at a rate at which the vaporizable material is injected into the molten bath, to volatilize, combust or decompose during exposure to said gas component, and thereby ensure that the molten bath will not explode; and b) injecting the vaporizable material into the gaseous dispersion at a rate which causes a significant portion of the vaporizable material to volatilize, combust or decompose during exposure of said material to the gas component of said gaseous dispersion, thereby ensuring that the molten bath will not explode.

* * * * *